(12) United States Patent
Yabuki et al.

(10) Patent No.: US 6,212,157 B1
(45) Date of Patent: Apr. 3, 2001

(54) APPARATUS FOR SUPPRESSING WARPING OPTICAL DISK AND OPTICAL DISK APPARATUS

(75) Inventors: Eiji Yabuki; Tadashi Sato, both of Kawasaki (JP)

(73) Assignee: Fujitsu Limited, Tokyo (JP)

( * ) Notice: Subject to any disclaimer, the term of this patent is extended or adjusted under 35 U.S.C. 154(b) by 0 days.

(21) Appl. No.: 08/967,118

(22) Filed: Nov. 12, 1997

(30) Foreign Application Priority Data

Jul. 16, 1997 (JP) .................................................... 9-191633

(51) Int. Cl.[7] .................................................. G11B 25/00
(52) U.S. Cl. .............................................................. 369/263
(58) Field of Search ............................ 369/13, 251, 263, 369/261, 195, 284; 360/114, 104

(56) References Cited

U.S. PATENT DOCUMENTS

| 3,927,252 | * | 12/1975 | Polley | 179/6.7 |
| 4,334,302 | * | 6/1982 | Peppers | 369/261 |
| 4,788,671 | * | 11/1988 | Kanda | 369/13 |
| 4,814,922 | * | 3/1989 | Osanai | 360/130.3 |
| 4,887,176 | * | 12/1989 | Dussinger et al. | 360/105 |
| 5,062,020 | * | 10/1991 | Osanai | 360/130.34 |
| 5,197,049 | * | 3/1993 | Wehrenberg | 369/13 |
| 5,392,263 | * | 2/1995 | Watanabe et al. | 369/13 |
| 5,481,508 | * | 1/1996 | Watanabe et al. | 369/13 |
| 5,657,300 | * | 8/1997 | Takahashi | 369/13 |

FOREIGN PATENT DOCUMENTS 62-47864 * 3/1987 (JP) .
6-325428 * 11/1994 (JP) .

* cited by examiner

Primary Examiner—Brian E. Miller
Assistant Examiner—Kenneth W. Fields
(74) Attorney, Agent, or Firm—Greer, Burns & Crain, Ltd.

(57) ABSTRACT

An apparatus for suppressing warping of a rotating optical disk including a disk warp suppressing member facing a surface of the upturned side of the optical disk in a manner to be in sliding contact with the optical disk, and an elastic member for supporting the disk warp suppressing member and forcing it toward the optical disk. The apparatus also has a carriage which faces a rotation region of the optical disk so as to move freely in the radial direction of the optical disk, and is provided with light beam irradiating means, with the elastic member being fitted to the carriage.

15 Claims, 5 Drawing Sheets

APPARATUS FOR SUPPRESSING WARPING OPTICAL DISK AND OPTICAL DISK APPARATUS

BACKGROUND OF THE INVENTION

The present invention relates to an apparatus for suppressing warping of an optical disk during its rotary driving, and an optical disk apparatus equipped with such an apparatus for suppressing warping.

Figure 1:
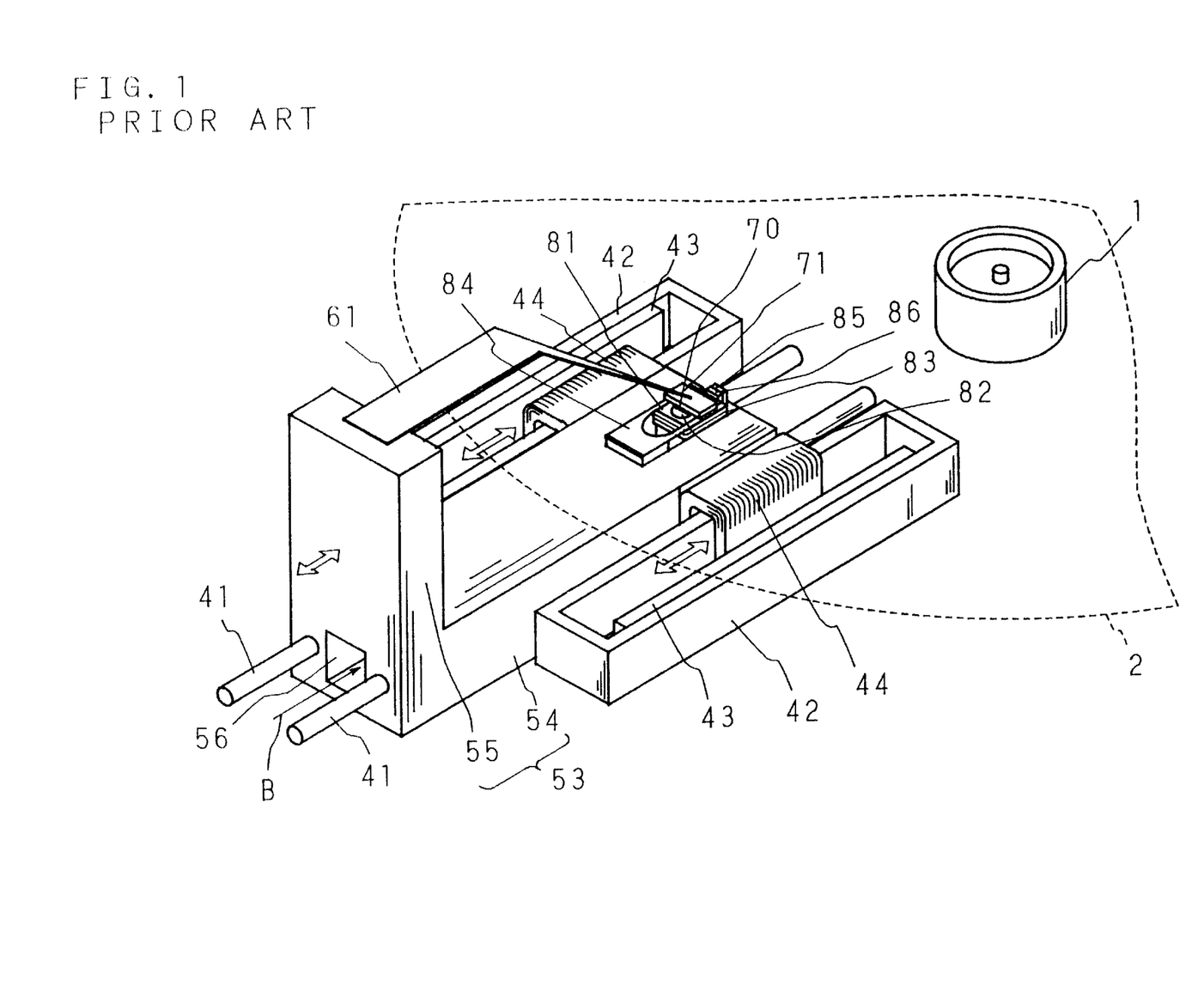
FIG. 1 is a perspective view showing a constitution of an essential part of a conventional optical magnetic disk apparatus of magnetic field modulation system.

FIG. 1 is a perspective view showing a constitution of an essential part of a conventional magnetic field modulation type optical disk apparatus. In the drawing, numeral 53 denotes a carriage that is approximately L-shaped in lateral side view. Numerals 41, 41 denote guide shafts to guide the carriage 53. The carriage 53 is formed of: (1) a carriage body 54 of rectangular parallelepiped which is long in the radial direction of a donut shaped optical disk 2 (which is driven in rotation by a rotary spindle) 1; and (2) a supporting part 55 which is located at the end part of the outer peripheral side (front side) of the optical disk 2, where this supporting part extends upright of the carriage body 54. A load arm 61, to be described later, is fixed to the upper end of the supporting part 55.

The guide shafts 41, 41 are provided on one side of the optical disk 2 at a predetermined distance in parallel with each other so that the center line between the two guide shafts 41, 41 is in the radial direction of the optical disk 2. The carriage body 54 is provided with two through-holes having approximately the same diameters as those of the guide shafts 41, 41, the through-holes penetrating through the carriage body 54 from its front to the back side (the inner peripheral side of the optical disk 2) in parallel with each other at a predetermined distance. By letting the guide shafts 41, 41 through the through-holes, the carriage 53 is swingably supported in the radial direction of the optical disk 2.

At the central lower part in front of the carriage body 54 there is provided a light conductive hole 56 for leading light beam B in parallel with the through-hole so as to allow the light beam B from a fixed light source disposed opposite to the light conductive hole 56 to be incident in the light conductive hole 56. On the back side of the carriage body 54 there is provided an opening communicating with the light conductive hole 56, and a lens holder 81 is held in cantilever at an end of the front side of the opening. The lens holder 81 has a rectangular tubular shape which has opening vertically and is longer in the thickness direction of the carriage body 54 when viewed from the side. On the upper and lower faces of the end of the front side of the opening there are fixed the base parts of the flat springs 84 having the U-shaped notches, respectively, and the apexes of the flat springs 84 are fixed to the upper and lower faces of the lens holder 81 on the front side.

On the front side in the lens holder 81, an objective lens 82 is fixed in parallel with the upper face of the carriage body 54. The objective lens 82 condenses the light beam B that is reflected upwardly by a reflecting mirror disposed opposite below the objective lens 82 and emits it to the optical disk 2. The lens holder 81 is inserted at the back side of a leg of the U-shaped yoke 85 for focusing, which is fixed to the carriage body 54. On the inner face of the other leg of the yoke 85 for focusing, a magnet 86 for focusing is fitted. Also, around the lens holder 81 a focus coil 83 is fitted which is wound multiple times around a shaft parallel with the optical axis of the objective lens 82. The focus coil 83 is disposed orthogonal with a magnetic field formed by the magnet 86 for focusing and the yoke 85 for focusing. And, by leading electric current in the focus coil 83, focus control is made to cause ascending or descending of the lens holder 81 which holds the objective lens 82, and on which the focus coil 83 is wound, in the direction of the optical axis of the objective lens 82.

The load arm 61 fixed to the upper end of the supporting part 55 is a flat spring, which extends from the upper end of the supporting part 55 toward the optical disk 2 by a predetermined size in parallel with the carriage body 54, and from that place the load arm 61 is inclined toward the optical disk 2 at a predetermined angle of inclination. The tip of the load arm 61 is acute, and is situated at the predetermined position above the lens holder 81. Also, the tip is made to be movable up and down by a lift device. To the tip of the load arm 61 there is fitted, in a swingable manner, a slider 71 having a rectangular shape in plan view so that the optical disk 2 is set between the slider 71 and the lens holder 81. To the lower face of the slider 71 there is fixed a magnetic head 70 made by winding a coil around a core so as to be positioned at the center of the objective lens 82. The slider 71 is in direct contact with the surface of the optical disk 2 when the optical disk 2 is in a still state.

By the air current generated by the rotary driving of the optical disk 2, buoyancy is generated on the slider 71, but as a force directed toward the optical disk 2 is exerted to the slider 71 side by the spring force of the load arm 61, the slider 71 floats at the position where the two items are balanced. The buoyancy as described above is strong when the distance between the slider 71 and the optical disk 2 is short, and weak when the distance is long. On the other hand, the force to be exerted to the slider 71 from the load arm 61 is weak when the distance between the slider 71 and the optical disk 2 is short, and strong when the distance is long. Accordingly, during the rotation of the optical disk 2, the distance between the slider 71 and the optical disk 2 is kept constant.

On the back side portions of both sides of the carriage body 54 there are fixed tubular drive coils 44, 44 wound in multiple turns around a shaft in parallel with the guide shafts 41, 41. Also, on both sides of the carriage body 54, there are disposed the frame shaped yokes 42, 42 which are open up and down and long in the lengthwise direction of the guide shafts 41, 41 in a manner that the lateral surfaces in the longitudinal direction of the two yokes 42, 42 and the lateral surfaces of the carriage body 54 are in parallel with one another. On the respective side walls opposite to the carriage body 54 of the two yokes 42, 42, the drive coils 44, 44 are externally accommodated without contact. On the inner surface of the other side walls respectively of the two yokes 42, 42, there are fitted plate form magnets 43, 43 having approximately the same length as those of the yokes 42, 42, so that a magnetic field formed by the magnets 43, 43 and yokes 42, 42 crosses at a right angle with parts of the drive coils 44, 44.

When the reciprocal current is led to the drive coils 44, 44, by the reciprocal actions with the magnetic field, the carriage 53 supporting the drive coils 44, 44 advances or recedes in the lengthwise direction of the yokes 42, 42, i.e., in the radial direction of the optical disk 2. By this step, there is performed an access control to converge the light beam B to be irradiated on the optical disk 2 from the objective lens 82 on the upper surface of the optical disk 2 and move its spot to the required track of the optical disk 2, and a track control to have the spot of the light beam B follow the track of access. Alternatively, the track control can be realized by providing an actuator for moving the lens holder 81 to the radial direction of the optical disk 2. At this time, the magnetic head 70 is always positioned at the center of the objective lens 82 because it is supported to the carriage 53 by the load arm 61 to which the slider 71 fixed with the magnetic head 70 is fixed.

And, while irradiating the light beam B of predetermined intensity on the recording face of the optical disk 2 while carrying out the controls as described above, a magnetic field in one of reciprocal directions is applied from the magnetic head 70 opposed to the objective lens 82, by which the required data are written in the optical disk 2. To the recording face of the optical disk 2 in which the data are written, the light beam B is irradiated without applying the magnetic field, and the direction of rotation on a deflection face of the reflection light from the optical disk 2 is detected, by which the data written in the optical disk 2 is read out.

In such an apparatus, the spot diameter of the light beam must be reduced by enlarging the numerical aperture of the objective lens and the recording density of the data must be improved. In this case, as the numerical aperture of the objective lens is made larger, due to the warping or slight inclination of the optical disk, aberration of the light beam becomes large, and the detection precision of the reflected light in the direction of rotation is lowered. For this reason, there is proposed an optical disk whose thickness is reduced to about half that (0.6 mm) of a conventional disk. By this step, it is schemed that the aberration of the light beam B which is incident from the lower face of the optical disk 2 and converges on the upper face side caused by inclination or warping of optical disk is decreased to improve the recording density.

By the way, when, as described above, the slider to which the magnetic head is fixed is disposed opposite to the optical disk, downward force is exerted to the optical disk by the counter-action of buoyancy formed on the slider, i.e., by the air current whose direction is changed to the direction toward the optical disk by the slider. When using an optical disk of conventional thickness, the optical disk is not affected by this force, but when using a thin optical disk, there is a problem that warping is formed on the optical disk by a force, and large aberration of the light beam is produced by this warping. Further, if the magnetic head is fixed to the sliding type slider which is in contact with the optical disk in place of the floating type slider as mentioned above, the optical disk shows warping. On the other hand, in the case of using the thin optical disk, this warping occurs slightly even by its own weight, and therefore, even in the optical disk apparatuses other than the magnetic field modulation type, there are problems similar to the above.

BRIEF SUMMARY OF THE INVENTION

The present invention has been devised to solve the above problems. An object of the present invention is to provide an apparatus for suppressing warping of an optical disk which is preventive of lowering of the reading precision of recorded data even when using a thin optical disk, by adopting such constitution as to comprise a member for suppressing warping which is disposed to be opposite to the surface of the upturned side of the optical disk in sliding contact with the optical disk and an elastic member for supporting the warping suppressing member and forcing it toward the optical disk, and an optical disk apparatus provided with the apparatus.

The apparatus for suppressing warping of an optical disk and an optical disk apparatus provided with the apparatus are characterized by comprising a member for suppressing warping which is disposed to be opposite to the surface of the upturned side of the optical disk in sliding contact with the optical disk and an elastic member for supporting the warping suppressing member and forcing it toward the optical disk.

Accordingly, as the member for suppressing warping, a floating type or sliding type slider disposed to be opposite to the surface of the upturned side of the optical disk is supported by the elastic member. In the floating type slider, a force directed to the optical disk is generated by the counteraction of the buoyancy formed on the slider, and by this force the warping of the optical disk is suppressed. In the slider of the sliding type, warping of the optical disk is suppressed by the contact force of the elastic member that brings the slider into contact with the optical disk. Due to this contrivance, lowering of precision in the data recording and reproducing can be prevented even when using a thin optical disk.

The present invention is applicable to a so-called magnetic field modulation type optical magnetic disk apparatus in which a magnetic field is given to the surface opposite to the surface on which the light beams are irradiated, only around the irradiation position of the light beams. Opposite to this light beam irradiating surface, i.e., to the surface which is opposite to the optical disk surface which is opposite to a slider for magnetic head to which the magnetic head to give the magnetic field is fixed, a floating type or sliding type slider is disposed as a warp suppressing member, and the slider is supported by an elastic member. While the optical disk shows a tendency to warp toward the light beam irradiated surface by the slider for magnetic head, because the force directed toward the surface opposite to the light beam irradiated surface is given by the slider as the warp suppressing member disposed opposite to the light beam irradiation surface, warping toward the light beam irradiated surface is suppressed. Because of this constitution, even in case of using a thin optical magnetic disk of magnetic modulation system, lowering of the reading precision of the recorded data can be prevented.

The elastic member is, for example, a load arm having a long size plate form having at an end of its longitudinal direction a warp suppressing member to be in contact with the optical disk during the rotation of the optical disk or a warp suppressing member receding from the optical disk during the rotation of the optical disk. By this contrivance, fitting of the warp suppressing apparatus to the optical disk apparatus is facilitated.

The present invention is further furnished with another warp suppressing member (second warp suppressing member) disposed on the opposite side to the side on which the first warp suppressing member (in above paragraphs) is disposed and another elastic member for supporting the second warp suppressing member and forcing it toward the optical disk. Due to this constitution, mutually opposite forces are given to the optical disk, so that the warping of the optical disk can be suppressed.

In the present invention, in case the first warp suppressing member and/or the second warp suppressing member are disposed in the vicinity of the outer periphery of the optical disk which is for example not the recording region of the optical disk, there is no apprehension that the member will damage the recording region of the optical disk. On the other hand, as it suppresses the warping of the optical disk in the vicinity of the outer periphery, which shows the largest warping amount of the optical disk, it shows a large warp suppressing effect.

The elastic member faces the rotation region of the optical disk so as to move freely in the radial direction of the optical disk, and it can be fitted to a carriage provided with light beam irradiating means. Consequently, where the carriage supports the slider to which a magnetic head is fixed, the distance between the slider and the warp suppressing member is constant, and stabilized warp suppressing effect can be obtained.

In case the warp preventing apparatus is fixed to a base of the carriage on which the light irradiating means are provided, or to the support such as a frame member of the optical disk apparatus on which the base is fixed or outer cover, the warp preventing apparatus can be installed without causing an increase in the weight of the carriage, and warping of the optical disk can be prevented while maintaining the operating performance of the carriage.

The above and further objects and features of the invention will more fully be apparent from the following detailed description with accompanying drawings.

DETAILED DESCRIPTION OF THE INVENTION

Hereinafter, the present invention is described in detail with reference to the drawings which show the embodiments thereof.

Embodiment 1

Figure 2:
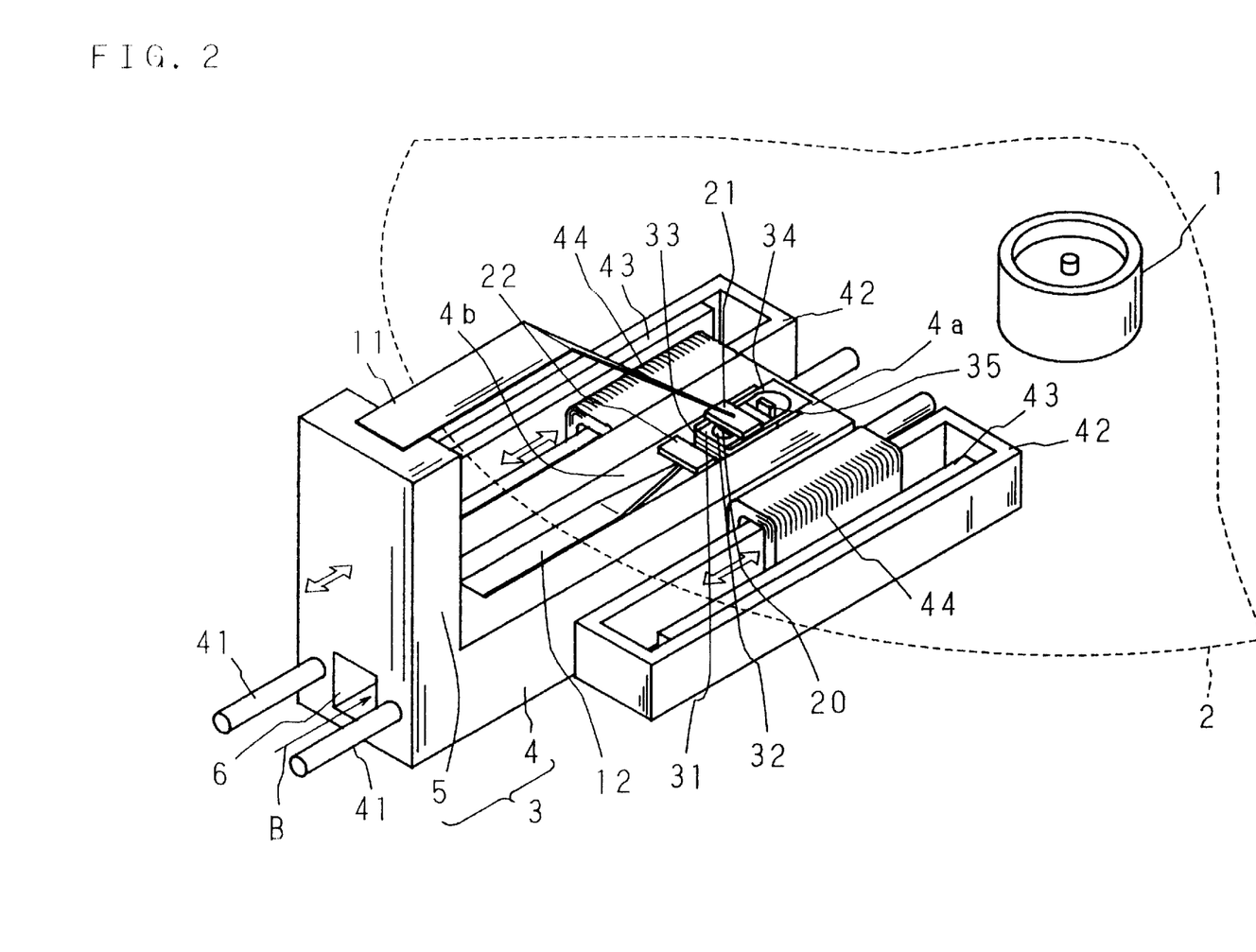
FIG. 2 is a perspective view showing a constitution of an essential part of an optical disk apparatus according to the present invention.

FIG. 2 is a perspective view showing a constitution of an important part of an optical disk apparatus according to the present invention. In the drawing, numeral 3 denotes a carriage that is approximately L-shaped in lateral side view, and 41, 41 denote guide shafts to guide the carriage 3. The carriage 3 is formed of a carriage body 4 extending in the radial direction of a donut shaped optical disk 2 (which is driven in rotation by a rotary spindle 1) and a first supporting part 5 which is provided to extend upright at the end part of the outer peripheral side (front side) of the optical disk 2 of the carriage body 4. On the top face of the carriage body 4 there is provided a recess 4b which is long in a radial direction. A first load arm 11 is fixed to the upper end of the first supporting part 5.

The guide shafts 41, 41 are provided on a lower surface side of the optical disk 2 at a predetermined distance in parallel with each other so that the center line between the two guide shafts 41, 41 is in the radial direction of the disk. The carriage body 4 is provided with through-holes having approximately the same diameters as those of the guide shafts 41, 41, the through-holes penetrating through the carriage body 4 from its front to the back side (the inner peripheral side of the optical disk 2) in parallel with each other at a predetermined distance. By letting the guide shafts 41, 41 through the through-holes, the carriage 3 is slidably supported in the radial direction of the optical disk 2.

At the central lower part in front of the carriage body 4 there is provided a light conductive hole 6 for leading light beam B in parallel with the through-hole so as to allow the light beam B from a fixed light source disposed opposite to the light conductive hole 6 to be incident in the light conductive hole 6. At the bottom of the back side of the recess 4b there is provided in a vertical direction an opening communicating with the light conductive hole 6, and the periphery at the back side of the recess 4b is a second supporting part 4a for supporting a lens holder 31. The lens holder 31 has a vertically extending opening and is formed of a rectangular tubular shape which is longer in the thickness direction of the carriage body 4 when viewed from the side. On the upper and lower faces of the second supporting part 4a there are fixed the base parts of the flat springs 34 having U-shaped notches, respectively, and the apexes of the flat springs 34 are fixed to the upper and lower faces of the lens holder 31 on the back side, thereby holding the lens holder 31 in a cantilever-type arrangement.

At the front side of the lens holder 31, an objective lens 32 is fixed in parallel with the upper face of the carriage body 4. The objective lens 32 condenses the light beam B that has been reflected upwardly by a reflecting mirror disposed in opposite state below the objective lens 32, and emits it to the optical disk 2. At the back side of the lens holder 31 is a leg of a U-shaped yoke 35 for focusing, which is fixed uprightly to the carriage body 4. On the inner face of the other leg of the yoke 35 for focusing, a magnet for focusing is fitted. Also, around the lens holder 31 a focus coil 33 is fitted which is wound multiple times around a shaft parallel with the optical axis of the objective lens 32. The focus coil 33 is disposed orthogonal with respect to a magnetic field formed by the magnet for focusing and the yoke 35 for focusing. And, by applying electric current to the focus coil 33, focus control is made to cause advance and recession of the lens holder 31 which holds the objective lens 32, and upon which the focus coil 33 is wound in the direction of the optical axis of the objective lens 32.

The first load arm 11, which is fixed to the upper end of the first supporting part 5, is a flat spring, which extends from the upper end of the first supporting part 5 toward the optical disk 2 by a predetermined size in parallel with the carriage body 4, and from there it is inclined toward the optical disk 2 at a predetermined angle of inclination. The tip of the first load arm 11 is sharp, and is situated at a predetermined position above the lens holder 31. Also, the tip is made movable up and down by a lift device. To the tip of the load arm 11 there is fitted a first slider 21 having a rectangular shape in plan view in swingable manner, so that the optical disk 2 is set between the first slider 21 and the lens holder 31. To the lower face of the first slider 21 is fixed a magnetic head 20 made by winding a coil around a core such that it is positioned flush with the lower face of the first slider 21 at the center of the objective lens 32.

By the air current generated by the rotary driving of the optical disk 2, buoyancy is generated on the first slider 21, but as a force directed toward the optical disk 2 is exerted to the first slider 21 by the spring force of the load arm 11, the first slider 21 shows floating movements at the position where the two forces mentioned above are balanced. The buoyancy is strong when the distance between the first slider 21 and the optical disk 2 is short, and weak when the distance is long. On the other hand, the force to be exerted to the first slider 21 from the load arm 11 is weak when the distance between the first slider 21 and the optical disk 2 is short, and strong when the distance is long. Accordingly, during the rotation of the optical disk 2, the distance between the first slider 21 and the optical disk 2 is kept constant.

On the back side portions of both sides of the carriage body 4 there are fixed tubular drive coils 44, 44 wound in multiple turns around a shaft that is parallel with the guide shafts 41, 41. Also, on both sides of the carriage body 4, there are disposed the frame shaped yokes 42, 42 which are open up and down and long in the lengthwise direction of the guide shafts 41, 41 in a manner that the lateral surfaces in the longitudinal direction of the two yokes 42, 42 and the lateral surfaces of the carriage body 4 are in parallel with one another. On respective side walls opposite to the carriage body 4 of the two yokes 42, 42, the drive coils 44, 44 are externally accommodated without contact with each other. On the inner face of the other side walls respectively of the two yokes 42, 42, there are fitted plate form magnets 43, 43 having approximately the same length as that of the yokes 42, 42, so that a magnetic field formed by the magnets 43, 43 and yokes 42, 42 crosses at a right angle with parts of the drive coils 44, 44.

When the reciprocal current is led to the drive coils 44, 44, by the reciprocal actions with the magnetic field, the carriage 3 supporting the drive coils 44, 44 advances or recedes in the lengthwise direction of the yokes 42, 42, i.e., in the radial direction of the optical disk 2. By this step, there is performed an access control to converge the light beam B to be irradiated on the optical disk 2 from the objective lens 32 on the upper surface of the optical disk 2 and move its spot to the required track of the optical disk 2, and a track control to have the spot of the light beam B follow the track of access. At this time, the magnetic head 20 is always positioned at the center of the objective lens 32 because it is supported to the carriage 3 by the first load arm 11 to which the first slider 21 (with the magnetic head 20) is fixed.

And, while irradiating the light beam B of predetermined intensity on the recording face of the optical disk 2 while carrying out the controls as described above, a magnetic field in one of reciprocal directions is applied from the magnetic head 20 opposed to the objective lens 32, by which the required data are written in the optical disk 2. To the recording face of the optical disk 2 in which the data are written in the above manner, light beam B is irradiated without applying a magnetic field, and the direction of rotation on a deflection face of the reflection light from the optical disk 2 is detected, by which the data written in the optical disk 2 is read out.

At this time, by the action of the buoyancy formed on the first slider 21, a downward force acts on the optical disk 2 and when a thin optical disk 2 is used, warp is caused to the optical disk 2. In order to prevent this warping, there is provided a warp suppressing apparatus having a second load arm (elastic member) 12 and a second slider (warp suppressing member) 22.

To the front side inner wall of the recess 4b provided on the upper face of the carriage body 4, the second load arm 12 having approximately the same configuration as that of the first load arm 11 is fixed. The second load arm 12 extends in the radial direction of the optical disk 2 by a predetermined size, and then it is inclined toward the optical disk 2 at a predetermined inclination angle. Its apex reaches the predetermined position outside the lens holder 31, and to its upper side there is attached the second slider 22 of rectangular shape in plan view in a freely swingable manner. The second slider 22 is similarly separated from the optical disk 2 to a position distant at a certain distance by the air current generated by the rotation of the optical disk 2, and by its counteraction it gives a force directed upward to the optical disk 2, thereby suppressing the warping of the optical disk 2.

Embodiment 2

Figure 3:
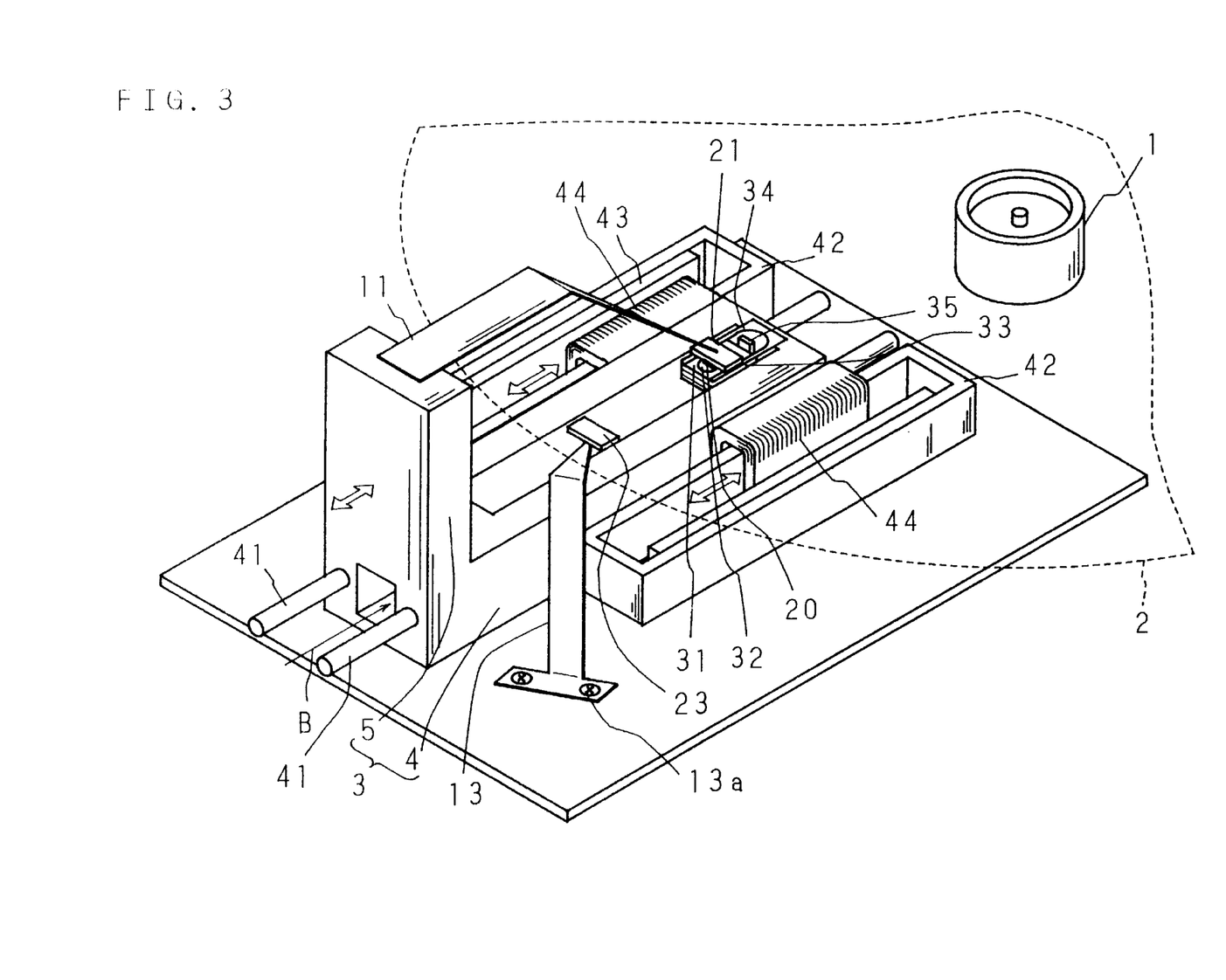
FIG. 3 is a perspective view showing Embodiment 2.

FIG. 3 is a perspective view showing Embodiment 2. It shows the case where a load arm provided on a warp suppressing apparatus is fixed to a part other than a carriage 3 of an optical disk apparatus. In the vicinity of an end of one yoke 42 there is provided an uprightly extending third load arm 13 of approximately the same configuration as that of the second load arm 12 shown in FIG. 2. The third load arm 13 extends vertically upwardly from the center on one side of a rectangular fixed part 13a, which is screwed to a base 10, to a position slightly lower than the optical disk 2, and from there it is inclined toward the position corresponding to the peripheral part of the optical disk 2 above the carriage 3 at a predetermined inclination angle. Its tip reaches the position near the lower face of the optical disk 2, and on its upper side there is provided a third slider 23 of rectangular shape in plan view in swingable manner. With respect to the portions corresponding to those shown in FIG. 2, the same numerals are assigned, and a description thereof has been omitted.

The third slider 23 is separated from the optical disk 2 to a position distant at a certain distance by the air current generated by the rotation of the optical disk 2, and by its counteraction it gives a force directed upward to the optical disk 2, thereby suppressing the warping of the optical disk 2. At this time, because the third load arm 13 is fixed to the base 10, warping of the optical disk 2 can be suppressed without increasing the weight of the carriage 3.

Embodiment 3

Figure 4:
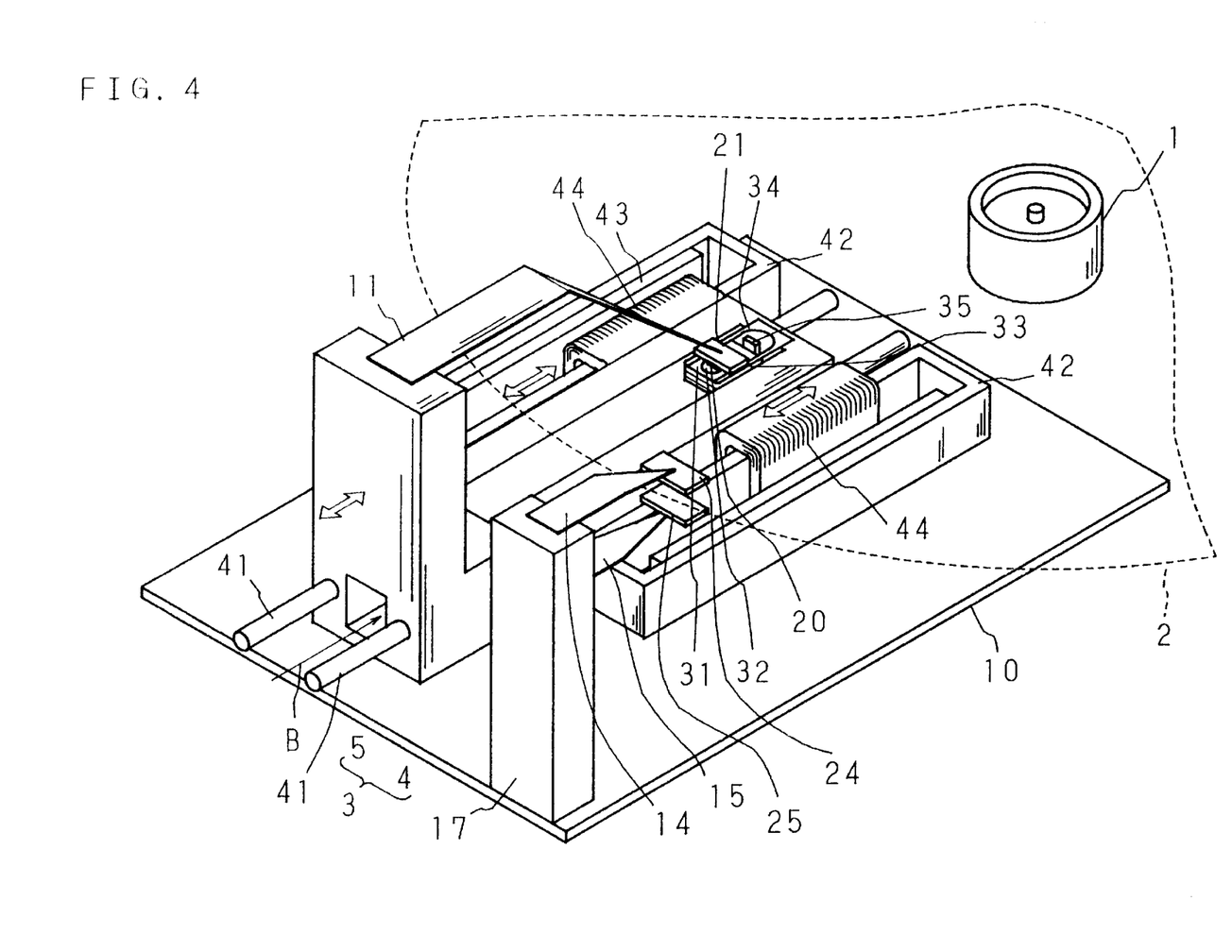
FIG. 4 is a perspective view showing Embodiment 3.

FIG. 4 is a perspective view showing Embodiment 3. It shows the case where two sliders of warp suppressing members are disposed in opposite manner above and below an optical disk 2. As shown in FIG. 4, on the position outside the optical disk 2 on one end side of a yoke 42 of a base 10 there is provided uprightly a pillar shaped supporting member 17 which is higher than the position of disposition of the optical disk 2. To the upper end of the supporting member 17 a fourth load arm 14 is fitted, and on the face of the optical disk 2 side of the supporting member 17 and in a position lower than the position of disposition of the optical disk 2, a fifth load arm 15 is fixed.

The fourth load arm 14 extends from the top end of the supporting member 17 toward the optical disk 2 by a predetermined size, and from there is inclined toward the optical disk 2 at a predetermined inclination angle. Its tip reaches a predetermined position near the outer periphery of the optical disk 2, and on its lower side there is provided, in a swingable manner, a fourth slider 24 of rectangular shape in plan view. The fifth load arm 15 extends from a position lower than the position of disposition of the optical disk 2 of the supporting member 17 toward the optical disk 2 by a predetermined size, and from there it is inclined toward the optical disk 2 at a predetermined inclination angle. Its tip is extended to a position opposite to the fourth load arm 14, and on its upper side there is provided, in a swingable manner, a fifth slider 25 of rectangular shape in plan view. The fourth load arm 14 and the fifth load arm 15 are allowed to move their tips up and down by the lift device. With regard to the portions corresponding to those shown in FIG. 2, the same numerals have been assigned and their descriptions have been omitted.

The optical disk 2 is driven by rotation under the state of being held by the fourth slider 24 and the fifth slider 25. The fourth slider 24 and the fifth slider 25 are separated from the optical disk 2 to a position distant at a certain distance by the air current generated by the rotation of the optical disk 2, and by its counteraction it gives the force directed upward and downward respectively to the optical disk 2, thereby suppressing the warping of the optical disk 2. On the other hand, since the fourth slider 24 and the fifth slider 25 are disposed in the vicinity of the outer periphery of the optical disk 2, there is no apprehension to cause damage to the recording region of the optical disk 2. Also, as the warping of the optical disk 2 is suppressed in the vicinity of the outer peripheral part at which the warming amount of the optical disk 2 is the largest, the warping suppressing effect is large.

Embodiment 4

Figure 5:
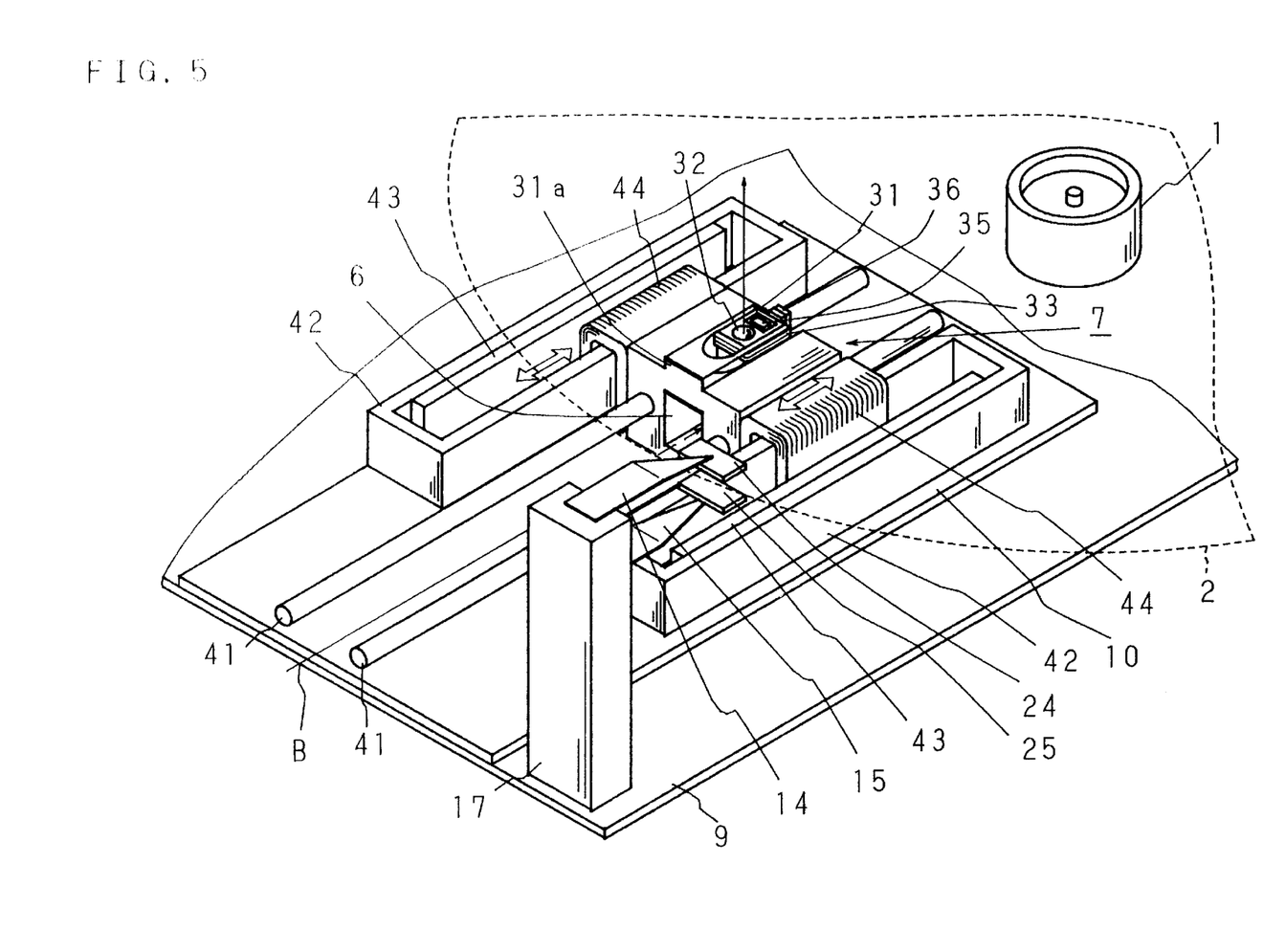
FIG. 5 is a perspective view showing Embodiment 4.

FIG. 5 is a perspective view showing Embodiment 4, which shows the case of application to an optical disk to be used exclusively for reproduction. At the central part of the front face of the carriage 7, which has an approximately parallelepiped shape, there is provided a light conductive hole 6 for conducting a light beam, so that the light beam B from a fixed light source disposed opposite to the light conductive hole 6 is incident in the light conductive hole 6. On the upper face of the carriage 7, an opening communicating with the light conductive hole 6 is formed with the front side portion retained, and said front side portion is made with a supporting part 31a for cantilever supporting a lens holder 31. On the upper and lower faces of the supporting part 31a the bases of plate springs 34 having U-shaped notches are fixed, and the apexes of the plate springs 34 are fixed to the upper and lower faces on the front side of the lens holder 31.

Yokes 42, 42 are fixed on a base 10. The base 10 is screwed to an outer cover (support stand) 9 of the optical disk apparatus. In the vicinity of the base 10 of the outer cover 9 there is fixed a warp suppressing apparatus provided with, as described above, a support member 17, a fourth load arm 14 and a fifth load arm 15 which are fitted thereto, and a fourth slider 24 and a fifth slider 25 provided respectively to the tips of them in swingable manner. With respect to the parts corresponding to FIG. 2 the same numerals are assigned and their illustrations are omitted. By this configuration, warping of the optical disk 2 is suppressed in the same manner as above.

In each embodiment described above, there is explained about the case where a floating type slider is used as a warp suppressing member, but the present invention is not limited to these embodiments. Needless to say, a sliding type slider that is configured to be in contact with the optical disk during the rotation of the optical disk may be used.

As this invention may be embodied in several forms without departing from the spirit of essential characteristics thereof, the present embodiments are therefore illustrative and not restrictive, since the scope of the invention is defined by the appended claims rather than by the description preceding them, and all changes that fall within the metes and bounds of the claims, or equivalence of such metes and bounds thereof are therefore intended to be embraced by the claims.

What is claimed is:

1. An apparatus for suppressing warping of an optical disk which is driven in rotation, comprising:
    a first disk warp suppressing member positioned to face a surface of the optical disk, said first warp suppressing member being configured and arranged to either slidably contact the optical disk surface during rotation of the optical disk or to float a slight distance away from the optical disk surface during rotation of the optical disk; and
    a first elastic member for supporting said first disk warp suppressing member and for biasing said first disk warp suppressing member toward the optical disk, wherein said first elastic member has a long plate form, and has at an end of its longitudinal direction said first disk warp suppressing member.

2. The apparatus according to claim 1, further comprising:
    a second disk warp suppressing member disposed on a side of the optical disk opposite to the side on which said first disk warp suppressing member is disposed; and
    a second elastic member for supporting said second disk warp suppressing member and for biasing said second disk warp suppressing member toward the optical disk.

3. The apparatus according to claim 2, wherein
    said first disk warp suppressing member and second disk warp suppressing member are each only disposed in the vicinity of the outer periphery of the optical disk.

4. The apparatus according to claim 1, wherein
    said first disk warp suppressing member is disposed only in the vicinity of the outer periphery of the optical disk.

5. The apparatus according to claim 1, whereby said first disk warp suppressing member is substantially maintained at a relatively constant floating distance, with respect to the optical disk, when an approximate equilibrium is reached between a biasing force created by said first elastic member and an air current force generated when the optical disk is rotated.

6. The apparatus according to claim 1, whereby during rotation of the optical disk, said first disk warp suppressing member is substantially maintained in sliding contact with the surface of the optical disk by a biasing force created by said first elastic member.

7. An optical disk apparatus wherein information can be recorded and/or reproduced, the apparatus comprising
    means for rotating an optical disk;
    means for irradiating a light beam to said optical disk; and
    a disk warp suppressing apparatus which includes:
        a first disk warp suppressing member positioned to face a surface of the optical disk, said first warp suppressing member being configured and arranged to either slidably contact the optical disk surface during rotation of the optical disk or to float a slight distance away from the optical disk surface during rotation of the optical disk; and
        a first elastic member for supporting said first disk warp suppressing member and for biasing said first disk warp suppressing member toward the optical disk, wherein said first elastic member has a long plate form, and also has at an end of its longitudinal direction said first disk warp suppressing member.

8. The optical disk apparatus according to claim 7, wherein
    said first disk warp suppressing member is disposed in the vicinity of the outer periphery of the optical disk.

9. An optical disk apparatus according to claim 7, further comprising means for giving a magnetic field to an area and its neighborhood, according to a light beam irradiated position, on a side opposite to a surface irradiated with the light beam.

10. The optical disk apparatus according to claim 7, further comprising a carriage facing toward a rotation region of the optical disk so as to move freely in the radial direction of the optical disk, and provided with the light beam irradiating means, wherein
    said first elastic member is attached to the carriage.

11. The optical disk apparatus according to claim 7, further comprising:

a carriage facing toward a rotation region of the optical disk so as to move freely in the radial direction of the optical disk, and provided with the light beam irradiating means;

a base for supporting said carriage; and a support for fixing said base, wherein said first elastic member is attached to either said base or to said support.

12. An optical disk apparatus wherein information can be recorded and/or reproduced, the apparatus comprising means for rotating an optical disk;

means for irradiating a light beam to said optical disk; and a disk warp suppressing apparatus which includes:
a first disk warp suppressing member positioned to face a surface of the optical disk, said first warp suppressing member being configured and arranged to float a slight distance away from the optical disk surface during rotation of the optical disk;

a first elastic member for supporting said first disk warp suppressing member and for biasing said first disk warp suppressing member toward the optical disk;

a second disk warp suppressing member disposed on a side of the optical disk opposite to the side on which said first disk warp suppressing member is disposed, said second warp suppressing member being configured and arranged to float a slight distance away from the optical disk surface during rotation of the optical disk; and a second elastic member for supporting said second disk warp suppressing member and for biasing said second disk warp suppressing member toward the optical disk, whereby said first disk warp suppressing member is substantially maintained at a relatively constant floating distance, with respect to the optical disk, when an approximate equilibrium is reached between a biasing force created by said first elastic member and an air current force generated when the optical disk is rotated and said second disk warp suppressing member is substantially maintained at a relatively constant floating distance, with respect to the optical disk, when an approximate equilibrium is reached between a biasing force created by said second elastic member and an air current force generated when the optical disk is rotated.

13. The optical disk apparatus according to claim 12, further comprising means for giving a magnetic field to an area and its neighborhood, according to a light beam irradiated position, on a side opposite to a surface irradiated with the light beam.

14. The optical disk apparatus according to claim 12, wherein said disk warp suppressing apparatus further includes:

a generally vertically extending supporting member for supporting said first and second elastic members;

wherein said first elastic member is a generally horizontally extending plate-like member and said second elastic member is a second generally horizontally extending plate-like member, whereby said first elastic member is configured and arranged to position said first disk warp suppressing member on one side of the optical disk and said second elastic member is configured and arranged to position said second disk warp suppressing member on another side of the optical disk.

15. An apparatus for suppressing warping of a magneto-optical disk which is driven in rotation, comprising:

a first disk warp suppressing member positioned to face a side of the magneto-optical disk opposite to a magnetization means where a magnetic head is attached, said first disk warp suppressing member being configured and arranged to either slidably contact the magneto-optical disk during rotation of the magneto-optical disk or to float a slight distance away from the magneto-optical disk during rotation of the magneto-optical disk; and a first elastic member for supporting said first disk warp suppressing member and for biasing said first disk warp suppressing member toward the magneto-optical disk, wherein said first elastic member has a long plate form, and also has at an end of its longitudinal direction said first disk warp suppressing member.

* * * * *